United States Patent [19]

Eguchi et al.

[11] Patent Number: 4,949,265
[45] Date of Patent: Aug. 14, 1990

[54] STEERING CONTROL SYSTEM FOR 4WD VEHICLE HAVING DRIVE TORQUE DISTRIBUTION CONTROL

[75] Inventors: Takaaki Eguchi, Isehara; Yuzo Sakita, Machida, both of Japan

[73] Assignee: Nissan Motor Co., Ltd., Japan

[21] Appl. No.: 309,887

[22] Filed: Feb. 14, 1989

[30] Foreign Application Priority Data

Feb. 18, 1988 [JP] Japan .................................. 63-33892

[51] Int. Cl.$^5$ .............................................. B62D 6/00
[52] U.S. Cl. ................................ 364/424.05; 180/140; 180/142; 280/91
[58] Field of Search ................... 364/424.05; 180/140, 180/141, 142, 143; 280/91

[56] References Cited

U.S. PATENT DOCUMENTS

| | | | |
|---|---|---|---|
| 4,552,241 | 11/1985 | Suzuki | 180/249 |
| 4,586,583 | 5/1986 | Yamakawa et al. | 180/247 |
| 4,666,013 | 5/1987 | Shibahata et al. | 180/141 |
| 4,679,809 | 7/1987 | Ito et al. | 280/91 |
| 4,757,870 | 7/1988 | Torii et al. | 180/233 |
| 4,834,205 | 5/1989 | Mizuno et al. | 180/141 |
| 4,878,557 | 11/1989 | Shibahata et al. | 180/140 |

FOREIGN PATENT DOCUMENTS

| | | |
|---|---|---|
| 60-229873 | 11/1985 | Japan . |
| 61-02383 | 5/1986 | Japan . |
| 62-8869 | 1/1987 | Japan . |
| 62-8872 | 1/1987 | Japan . |

*Primary Examiner*—Thomas G. Black
*Attorney, Agent, or Firm*—Leydig, Voit & Mayer

[57] ABSTRACT

In a 4WD vehicle, a drive control system for controlling a driving force distribution between front and rear wheels is combined with a steer angle control system which applies an auxiliary steering quantity in accordance with a derivative of a steering input, to the front or rear wheels. The steer angle control system is arranged to vary the auxiliary steering quantity responsive to the derivative of the steering input, in accordance with the front and rear wheel speed difference so as to maintain an optimum steering characteristic.

10 Claims, 5 Drawing Sheets

STEERING CONTROL SYSTEM FOR 4WD VEHICLE HAVING DRIVE TORQUE DISTRIBUTION CONTROL

REFERENCES TO RELATED APPLICATIONS

The following, commonly assigned, U.S. patent applications relate to vehicle steer angle control systems similar to an auxiliary steering control system of the present invention. (1) Ser. No. 195,085, filed on May 17, 1988. (2) Ser. No. 195,078, filed on May 17, 1988. (3) Ser. No. 245,148, filed on Sept. 16, 1988. (4) Ser. No. 275,061, filed on Nov. 22, 1988. (5) Ser. No. 07/277,745, filed on Nov. 30, 1988, and based on Japanese Application No. 62-299892 (Our ref. U181-88). (6) Ser. No. 07/277,744, filed on Nov. 30, 1988; and now U.S. Pat. No. 4,893,690 and based on Japanese Applications Nos. 62-299888 and 63-28858, (Our ref. U184-88). (7) Ser. No. 07/269,698, filed on Nov. 10, 1988, and based on Japanese Applications Nos. 62-284103 and 62-284104 (Our ref. U186-88). (8) Ser. No. 284,414, filed on Dec. 14, 1988 and based on Japanese Application No. 62-330281 (Our ref. U193-88). (9) Ser. No. 07/305,023, based on Japanese Application No. 63-24945, (Our ref. U019-89).

The following, commonly assigned, U.S. patent applications relate to driving force distribution control systems similar to that of the present invention. (10) Ser. No. 830,015, now U.S. Pat. No. 4,757,870. (11) Ser. No. 820,055, now U.S. Pat. No. 4,754,834. (12) Ser. No. 906,309, now U.S. Pat. No. 4,773,500. (13) Ser. No. 893,245, now U.S. Pat. No. 4,776,424. (14) Ser. No. 127,319, filed on Dec. 2, 1987 and now U.S. Pat. No. 4,874,056. (15) Ser. No. 277,746, filed on Nov. 30, 1988 and now U.S. Pat. No. 4,887,689. (16) Ser. No. 254,626, filed on Oct. 7, 1988 and now U.S. Pat. No. 4,846,298. (17) Ser. No. 254,875, filed on Oct. 7, 1988. (18) Ser. No. 255,820, filed on Oct. 11, 1988. (19) Ser. No. 277,377, filed on Nov. 29, 1988, and based on Japanese application No. 62-302472 (Our ref. U190-88). (20) Ser. No. 255,939, filed on Oct. 11, 1988.

BACKGROUND OF THE INVENTION

The present invention relates to a vehicle control system for controlling a ratio (a driving force distribution) between a driving force transmitted to rear wheels and a driving force transmitted to front wheels, and further controlling a front or rear wheel steer angle.

The above-mentioned application (19) proposes a driving force distribution control system arranged to increase a driving force to a front or rear wheel pair whose speed is lower than the speed of the other pair with an increase of the front and rear wheel speed difference. When this control system is applied to a vehicle in which the rear wheels are always driven, this control system increases a front wheel driving force transmitted to the front wheels with an increase of the front and rear wheel speed difference due to slippage of the driven rear wheels. When the slip of the rear wheels is reduced by increasing the front driving force, then this control system decreases the front wheel drive force. In this way, this control system maintains an optimum driving force distribution between the front and rear wheels.

When the vehicle is accelerated during a turn, the slippage of the rear wheels increases the oversteering tendency. In this case, this driving force distribution control system increases the understeering tendency and restore the steering characteristic of the vehicle to the neutral steer by increasing the front wheel driving torque with an increase of the front and rear wheel speed difference. When, on the other hand, the understeer is increased by slippage of the front wheels, this control system increases the oversteer to restore the steering characteristic to the neutral steer by increasing the driving force transmitted to the rear wheels. However, in a transient period from a change in the steering wheel angle until the steering characteristic is restored to the neutral steer, there appears an initial understeer or an initial oversteer corresponding to the front and rear wheel speed difference.

SUMMARY OF THE INVENTION

It is therefore an object of the present invention to provide a vehicle control system which can maintain an optimum steering characteristic by cancelling the above-mentioned initial understeer or oversteer.

According to the present invention, a control system for a vehicle having at least a primary driving wheel pair such as a rear wheel pair and a secondary driving wheel pair such as a front wheel pair, comprises a sensor group, a drive force distribution control actuator, an auxiliary steering actuator and a controller. The sensor group is a group of sensors for sensing conditions of the vehicle to determine a steering input such as a steering wheel angle or a front wheel steer angle, and a primary and secondary wheel speed difference such as a front and rear wheel speed difference. The drive force distribution control actuator is an actuator for controlling a drive force distribution between the primary driving wheel pair and the secondary driving wheel pair, in response to a drive force distribution control signal. The auxiliary steering actuator is an actuator for controlling a controlled wheel steer angle of a controlled wheel pair which is one of the primary wheel pair and secondary wheel pair, in response to an auxiliary steering control signal. The controller is means for first producing the drive force distribution control signal in accordance with the primary and secondary wheel speed difference, secondly determining an auxiliary steering quantity in accordance with a derivative of the steering input, and thirdly producing the auxiliary steering control signal in accordance with the auxiliary steering quantity. The controller comprises adjusting means for varying the auxiliary steering quantity based on the derivative of the steering input, in accordance with the primary and secondary wheel speed difference.

DETAILED DESCRIPTION OF THE INVENTION

One embodiment of the present invention is shown in FIGS. 1-9.

Figure 1:
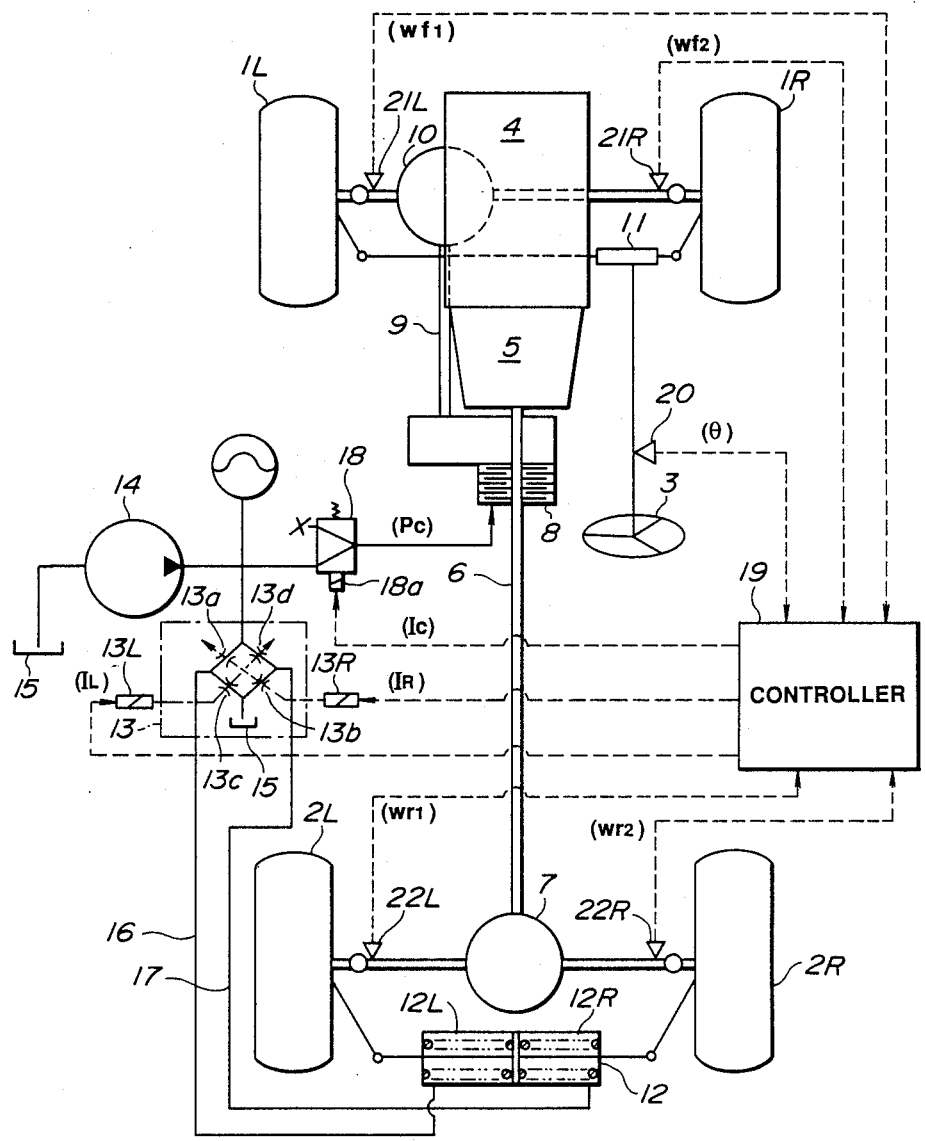
FIG. 1 is a schematic view of a vehicle equipped with a control system according to one embodiment of the present invention.
Figure 2:
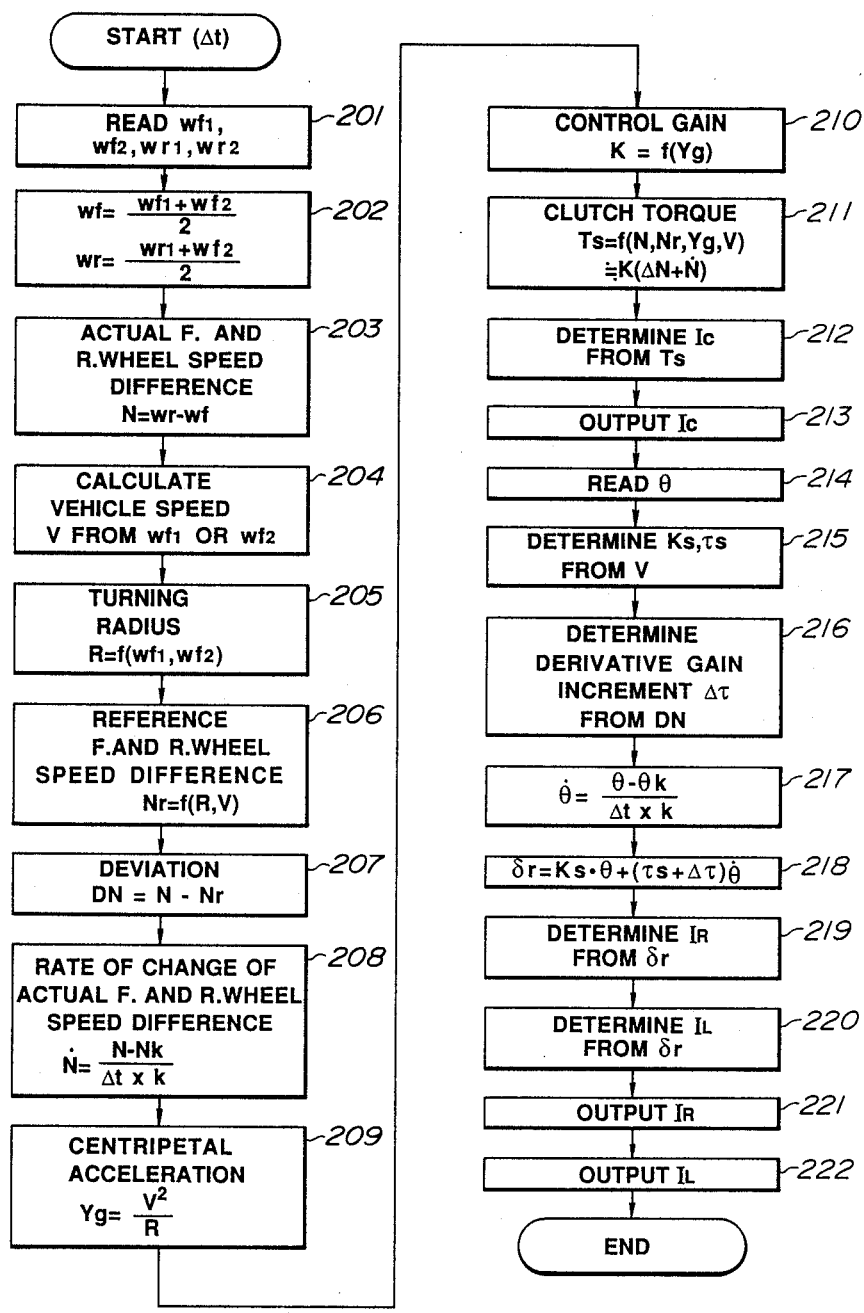
FIG. 2 is a flow chart showing a sequence of control operations performed by a controller of the control system shown in FIG. 1.

A vehicle shown in FIG. 1 has left and right front wheels 1L and 1R, left and right rear wheels 2L and 2R, and a steering wheel 3.

A drive system of the vehicle include an engine 4, a transmission 5, a rear propeller shaft 6, a rear differential gear 7, a front drive clutch 8, and a front propeller shaft 9, and a front differentialgear 10. A drive force transmitted from the engine 4 through the transmission 5 is further transmitted to the rear wheels 2L and 2R through the rear propeller shaft 6 and the rear differential gear 7. On the other hand, the drive force outputted from the transmission 5 is transmitted to the front wheels 1L and 1R through the front drive clutch 8, the front propeller shaft 9 and the front differential gear 10. The front wheels 1L and 1R are drivingly connected with transmission 5 through the front drive clutch 8 whereas the rear wheels 2L and 2R are always connected with the transmission 5.

A steering system of the vehicle includes a steering gear 11 and a rear wheel steering actuator 12. The front wheels 1L and 1R are connected with the steering wheel 3 through the steering gear 11 so that the front wheels 1L and 1R are steerable through the steering gear 11 in the conventional manner. The rear wheels 2L and 2R are connected with the rear wheel steering actuator 12 so that the rear wheel steering actuator 12 can steer the rear wheels 2L and 2R.

The rear wheel steering actuator 12 of this embodiment is a spring center type hydraulic actuator having left and right power chambers 12L and 12R. When an oil pressure is supplied to the right power chamber 12R, the rear steering actuator 12 steers the rear wheels 2L and 2R to the right through an angle proportional to the magnitude of the supplied oil pressure. When the oil pressure is supplied to the left power chamber 12L, the rear steering actuator 12 steers the rear wheels 2L and 2R to the left through an angle proportional to the oil pressure.

Figure 8:
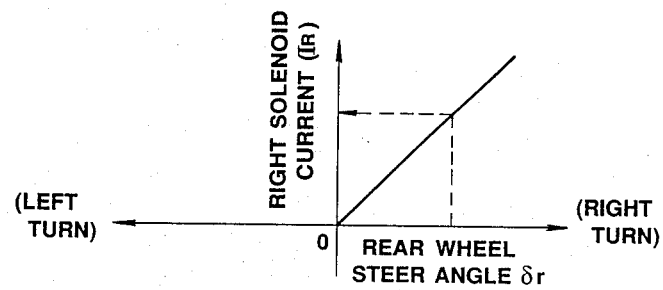
FIGS. 8 and 9 are graphs each showing a relationship between a rear wheel steer angle and a right or left solenoid exciting current.
Figure 9:
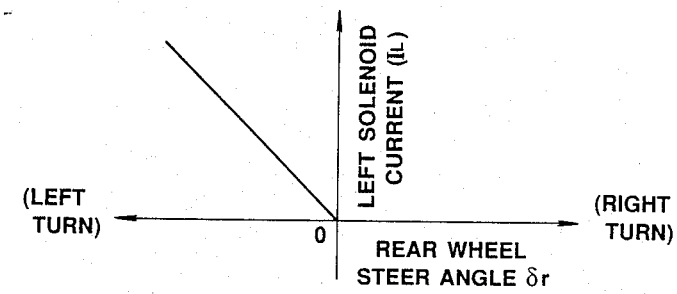

An electromagnetic proportional type rear wheel steering control valve 13 is connected with the rear steering actuator 12 for controlling the oil pressure supplied to the actuator 12. The control valve 13 has four variable orifices 13a, 13b, 13c and 13d which are connected in a bridge. This bridge circuit of the variable orifices are connected with an oil pump 14, a reservoir 15, a left oil pressure passage 16 leading to the left power chamber 12L and a right oil pressure passage 17 leading to the right power chamber 12R, as shown in FIG. 1. The control valve 13 further has left and right solenoids 13L and 13R. When both solenoids are off, then the opposite orifice pair 13a and 13b, and the opposite orifice pair 13c and 13d are both fully opened, so that both chambers 12L and 12R of the rear wheel steering actuator 12 are put in a non-pressure state. When the solenoid 13L or 13R is energized by a left solenoid current $I_L$ or a right solenoid current IR, then the orifice pair 13c and 13d or the orifice pair 13a and 13b are closed to a reduced opening degree corresponding to the magnitude of the solenoid exciting current $I_L$ or $I_R$, so that the fluid pressure corresponding to the current $I_L$ or $I_R$ is supplied to the power chamber 12L or 12R of the actuator. Consequently, the actuator 12 steers the rear wheels 2L and 2R in the controlled direction through an angle corresponding to the supplied fluid pressure. The rear steering actuator 12 of this embodiment controls a rear wheel steer angle $\delta_r$ (delta r) in accordance with the currents $I_L$ and $I_R$ as shown in FIGS. 8 and 9.

Figure 6:
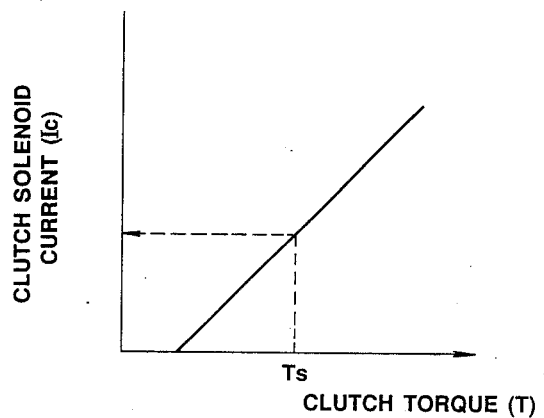
FIG. 6 is a graph showing a relationship between the clutch torque and a clutch solenoid current.

An electromagnetic proportional pressure regulating valve 18 is connected with the front wheel drive clutch 8, for controlling a clutch fluid pressure Pc supplied to the front drive clutch 8, which is arranged to transmit a driving torque corresponding to the clutch pressure Pc, to the front wheels 1L and 1R. The clutch pressure control valve 18 normally holds the clutch pressure Pc equal to zero. As a current Ic for energizing a clutch control solenoid 18a of the valve 18 is increased, the clutch pressure control valve 18 increases the clutch pressure Pc by admitting an output pressure of the pump 14 to the clutch 8. Thus, the front drive clutch 8 and control valve 18 control a clutch torque T transmitted through the clutch 8 to the front wheels 1L and 1R, in accordance with clutch solenoid exciting current Ic, as shown in FIG. 6.

A controller 19 is provided for controlling the exciting currents $I_L$, $I_R$ and Ic of the solenoids 13L, 13R and 18a. The controller 19 is connected with a sensor group for sensing various conditions of the vehicle. The sensor group of this embodiment includes a steering angle sensor 20 for sensing a steering angle $\theta$, and wheel speed sensors 21L, 21R, 22L and 22R for sensing wheel speeds wf1, wf2, wr1 and wr2 (rpm) of the wheels 1L, 1R, 2L and 2R, respectively. Signals of these sensors are inputted into the controller 19. In this embodiment, the steering angle sensor 20 is a steering wheel angle sensor, and the steering angle $\theta$ is a steering wheel angle. By using these sensor signals, the controller 19 controls the front wheel driving force to control the driving force distribution between the front and rear wheels by controlling the clutch solenoid current Ic, and controls the rear wheel steer angle by controlling the left and right solenoid currents $I_L$ and $I_R$. In this embodiment, the controller 19 performs a sequence of operations shown in FIG. 2 repeatedly at regular intervals of t (Delta t).

At a first step 201, the controller 19 reads the wheel speeds wf1, wf2, wr1 and wr2. Then, at a step 202, the controller 19 determines a front wheel speed wf and a rear wheel speed wr. In this embodiment, the front wheel speed wf is the average of the front left wheel speed wf1 and the front right wheel speed wf2, and the rear wheel speed wr is the average of the rear left wheel speed wr1 and the rear right wheel speed wr2. That is;

$$wf = \frac{wf1 + wf2}{2}$$

$$wr = \frac{wr1 + wr2}{2}$$

At a step 203, the controller 19 determines an actual front and rear wheel speed difference N by subtracting the front wheel speed wf from the rear wheel speed wr.

$$N = wr - wf$$

At a step 204, the controller 19 determines a vehicle speed V. In this embodiment, the controller 19 determines the vehicle speed V from wf1 and wf2 by a select low operation, and V is equal to a smaller one of the front left speed wf1 and the front right speed wf2. In this vehicle of this embodiment, the rear wheels are driven all the time, and the front wheels are driven appropriately. Therefore, the front wheel speeds wf1 and wf2 are closer to the actual vehicle speed than the rear wheel speeds wr1 and wr2. And, the smaller of the left and right front wheels wf1 and wf2 is closer to the actual vehicle speed than the greater. Thus, V is equal to wf1 when wf1 is lower than wf2, and V is equal to wf2 when wf2 is lower.

At a step 205, the controller 19 determines a turning radius R of the vehicle by using the left and right front wheel speeds wf1 and wf2. In this embodiment, the turning radius R is a function of the wf1 and wf2.

$$R = f(wf1, wf2)$$

For example, R is determined by dividing the vehicle speed V by the difference between the left and right front wheel speeds, and multiplying the resulting quotient by a predetermined constant K, as explained in the above-mentioned application Ser. No. 277,746. At a step 206, the controller 19 determines a reference front and rear wheel speed difference Nr, which is a function of the turning radius R and the vehicle speed V.

$$Nr = f(R, V)$$

Figure 3:
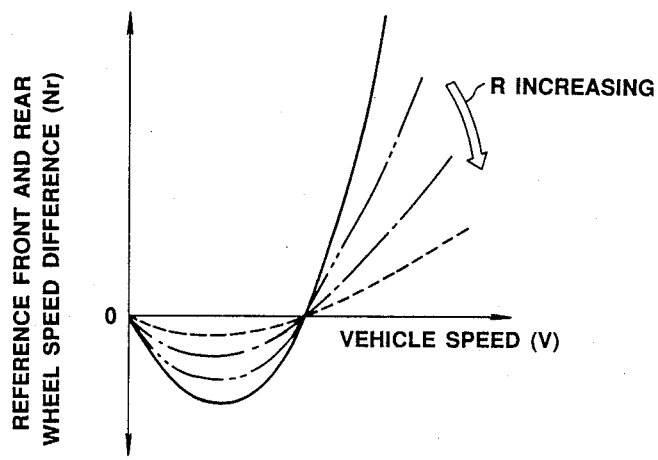
FIG. 3 is a graph for illustrating a reference front and rear wheel speed difference, used in the operations of FIG. 2.

The reference front and rear wheel speed difference Nr is shown in FIG. 3. The reference front and rear wheel speed difference Nr is a front and rear wheel speed difference due to a difference in turning radius between the front and rear wheels. The reference front and rear wheel speed difference is explained in the above-mentioned U.S. Pat. No. 4,776,424. At a step 207, the controller 19 determines a deviation DN of the actual front and rear wheel speed difference N from the reference speed difference Nr. That is, $DN = N - Nr$.

At a step 208, the controller 19 determines a time rate of change of the actual front and rear wheel speed difference N. In this embodiment, the time rate of change $\dot{N}$ is determined by using a current value N of the actual front and rear wheel speed difference which has been determined at the step 203 in the current operating cycle, and an old value Nk of the actual front and rear wheel speed difference which was determined k cycles ago. The controller 19 of this embodiment determines the time rate of change by dividing a difference between N and and Nk by an elapsed time $\Delta t \times k$.

$$\dot{N} = \frac{N - Nk}{\Delta t \times k}$$

At a step 209, the controller 19 determines a centripetal acceleration Yg of the vehicle by dividing the second power of the vehicle speed V by the turning radius R ($Yg = V^2/R$) At a step 210, the controller 19 determines a front and rear wheel speed driving force distribution control gain K which is a function of Yg, expressed as $K = f(Yg)$.

Figure 4:
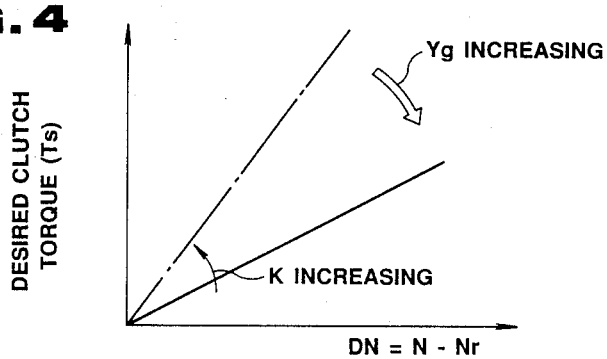
FIGS. 4 and 5 are graphs showing characteristics of, a desired torque transmitted through a front wheel drive clutch shown in FIG. 1.

FIG. 4 shows a desired clutch torque Ts of the front wheel drive clutch 8, which corresponds to a desired front wheel drive torque to obtain an adequate front and rear wheel driving force distribution. In this embodiment, the desired clutch torque Ts is increased as the deviation DN (=N−Nr) increases, and the rate of increase of the desired clutch torque Ts with respect to the deviation DN is decreased as the centripetal acceleration Yg increases. Thus, the controller 19 is arranged to increase the clutch torque of the clutch 8 as the deviation DN increases, and decreases the clutch torque as the centripetal acceleration Yg increases. When the vehicle speed V exceeds a predetermined high speed value, the controller 19 of this embodiment is arranged to increases the clutch torque in accordance with a vehicle speed responsive control characteristic shown in FIG. 5. In this embodiment, the desired clutch torque Ts is expressed as a function, $Ts = f(N, Nr, Yg, V)$, and accordingly Ts is given by $Ts \approx K(DN + \dot{N})$.

Figure 5:
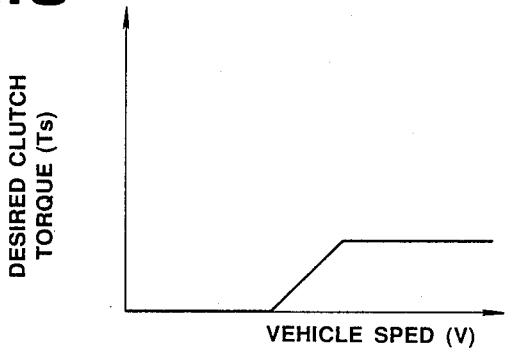

However, it is optional to eliminate the vehicle speed responsive control shown in FIG. 5, and to employ only the control responsive to the front and rear wheel speed difference.

At a step 212, the controller 19 determines the clutch solenoid exciting current Ic corresponding to the desired clutch torque Ts determined at the step 211 by a table lookup using a table corresponding to a graph shown in FIG. 6. Then, the controller 19 outputs Ic to the clutch solenoid 18a. Therefore, the front drive clutch 8 properly controls the front and rear wheel driving torque distribution by transmitting the desired torque to the front wheels.

When slippage of the rear wheels is caused by acceleration of the vehicle, and the front and rear wheel speed difference N is increased, then this control system increases the driving torque transmitted to the front wheels 1L and 1R as shown in FIG. 4. When the slip of the rear wheels is decreased because of an increase of the front wheel driving force, then this control system decreases the front wheel driving force. Thus, this control system maintains an adequate front and rear wheel driving force distribution. When the vehicle is accelerated during a turn, the slip of the rear wheels increases the oversteer tendency. In this case, the control system can restore the steer characteristic of the vehicle to the neutral steer by increasing the front wheel driving force. However, in a transient state which exists immediately after a change of the steering angle until the steering characteristic is restored to the neutral steer, there appears an initial understeer corresponding to the front and rear wheel speed difference. The control system of this embodiment is arranged to cancel such an initial understeer by the following auxiliary rear wheel steer angle control.

At a step 214, the controller 19 reads the steering wheel angle $\theta$. At a step 215, the controller 19 determines a proportional gain Ks and a derivative gain "tau s" ("tau s" is negative), corresponding to the vehicle speed V, by table lookups. The proportional gain and derivative gain are functions of the vehicle speed V, designed to achieve an ideal vehicle dynamic characteristics in which a yaw rate gain characteristic with respect to a steering frequency is flat, and the yaw rate can be obtained in proportion to the steering operation independently of the steering speed, without a phase delay. The proportional gain (or constant) and derivative gain (or constant) are explained more in detail in the above-mentioned U.S. patent application, filed on Dec. 14, 1988, based on Japanese application No. 62-330281 and Japanese Patent Provisional Publication No. 60-229873, laid open on Nov. 15, 1985. The explanation of these documents are herein incorporated by reference.

Figure 7:
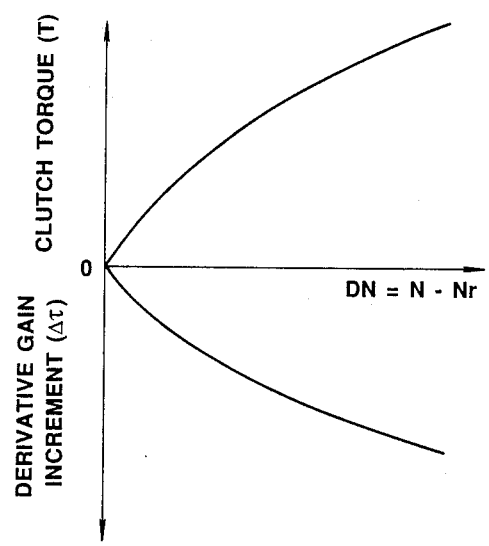
FIG. 7 is a graph showing a characteristic of a derivative gain increment used by the controller of this embodiment.

At a step 216, the controller 19 determines a derivative gain increment "delta tau" corresponding to the deviation DN by a table lookup using a table corresponding to a graph shown in FIG. 7.

At a step 217, the controller 19 determines a steering angular speed $\dot{\theta}$ which is a time rate of change of the steering angle $\theta$. In this embodiment, the steering angular speed is determined by using a current value $\theta$ of the steering wheel angle which has been obtained in the current operating cycle, an old value $\theta k$ of the steering wheel angle which was obtained k cycles ago, and an elapsed time $\Delta t \times k$ between these two cycles.

$$\dot{\theta} = \frac{\theta - \theta k}{\Delta t \times k}$$

At a step 218, the controller 19 determines a rear wheel steer angle $\delta_r$ from $\theta$, $\dot{\theta}$, Ks, $\tau s$ and $\Delta\tau$, in accordance with the following equation.

$$\delta r = Ks \cdot \theta + (\tau s + \Delta\tau)\dot{\theta}$$

In this equation, the derivative gain "tau s" and the derivative gain increment "delta tau" are both equal to or smaller than zero. Therefore, when the steering angular speed is greater than zero, the derivative control quantity $(\tau + \Delta\tau)\dot{\theta}$ is normally negative, so that this quantity acts to steer the rear wheels in the direction opposite to the steering direction of the front wheels. In this embodiment, the absolute value of the derivative gain increment is increased with increase in the deviation DN as shown in FIG. 7. Thus, the controller 19 increases the steering quantity of the rear wheels in the opposite direction to the front wheel steering direction by increasing the derivative control quantity on the negative side so as to cancel the initial understeer. As shown in FIG. 7, the controller 19 gradually increases the front wheel drive torque by increasing the clutch torque T with increase in the deviation DN, so that the initial understeer tendency is increased with increase in DN. Accordingly, the controller 19 increases the absolute value of the negative derivative gain increment "delta tau" with increase in DN.

At steps 219 and 220, the controller 19 determines the right and left solenoid exciting currents $I_R$ and $I_L$ to achieve the rear wheel steer angle determined at the step 218 by looking up tables corresponding to graphs shown in FIGS. 8 and 9. Then, the controller 19 outputs the right and left solenoid currents $I_R$ and $I_L$ at steps 221 and 222. Therefore, the rear wheel steering actuator 12 steers the rear wheels 2L and 2R so that the actual rear wheel steer angle is made equal to the rear wheel steer angle determined at the step 218.

Thus, the control system of this embodiment can eliminate a delay in the yawing response due to the initial understeer by increasing the opposite phase steering amount in accordance the front and rear wheel speed difference although the yaw rate gain characteristic is slightly deviated from the desired flat curve.

The control system of this embodiment is arranged to vary the gain "tau s" of the first derivative term $(\tau_s \cdot \dot{\theta})$ proportional to the first derivative of the steering angle $\theta$. However, when the rear wheel steer angle is set equal to a linear combination including not only the proportional term proportional to the steering wheel angle $\theta$, and the first derivative term proportional to the first derivative of $\theta$, but also a second or higher derivative term proportional to the second or higher derivative of the steering wheel angle $\theta$, it is possible to cancel or reduce the initial understeer by adjusting the second or higher derivative term in a similar manner.

The present invention is applicable to an auxiliary steering system arranged to steer the front wheels. In this case, the control system is arranged to vary the gain of the derivative term appearing in a mathematical expression for determining an auxiliary front wheel steer angle, so as to increase the actual front wheel steer angle in accordance with the front and rear wheel speed difference.

In the illustrated embodiment, the rear wheels are always driven, and the front wheel driving torque is controlled. However, the present invention is applicable to a driving force distribution control system arranged to always drive the front wheels and to control the rear wheel driving torque. In this case, the driving force distribution control system increases the rear wheel driving force when slippage occurs in the front wheels during acceleration. Therefore, this control system encounters a problem of an initial oversteer as contrasted to the initial understeer. This initial oversteer can be canceled by varying the derivative gain in the direction opposite to the direction to cancel the initial understeer.

What is claimed is:

1. A control system for a vehicle having primary and secondary driving wheel pairs, comprising;
    a sensor group for sensing conditions of said vehicle to determine a steering input and a difference between primary and secondary wheel speeds,
    a drive force distribution control actuator for controlling a drive force distribution between said primary driving wheel pair and said secondary driving wheel pair of said vehicle, in response to a drive force distribution control signal,
    an auxiliary steering actuator for controlling a controlled wheel steer angle of a controlled wheel pair which is one of said primary wheel pair and said secondary wheel pair, in response to an auxiliary steering control signal, and
    a controller for producing said drive force distribution control signal in accordance with said primary and secondary wheel speed difference, determining a derivative control steering quantity in accordance with a derivative of said steering input, and producing said auxiliary steering control signal in accordance with said derivative control steering quantity, said controller comprising adjusting means for varying said derivative control steering quantity in accordance with said primary and secondary wheel speed difference.

2. A control system according to claim 1 wherein said controller further comprises first controlling means for increasing a secondary drive force transmitted from an engine of said vehicle to said secondary driving wheel pair with increase in said primary and secondary wheel speed difference which is a difference resulting from subtraction of a secondary wheel speed of said secondary wheel pair from a primary wheel speed of said primary wheel pair, by varying said drive force distribution control signal.

3. A control system according to claim 2 wherein, as said primary and secondary wheel speed difference increases, said adjusting means varies said derivative control steering quantity in such a direction as to increase a yaw rate of said vehicle.

4. A control system according to claim 2 wherein said controller further comprises second controlling means for determining a total auxiliary steering quantity represented by said auxiliary steering control signal so that said total auxiliary steering quantity is proportional to a sum of addends comprising a first addend proportional to said steering input, and a second addend which is equal to said derivative control steering quantity and proportional to said derivative of said steering input.

5. A control system according to claim 4 wherein said adjusting means is means for determining an increment in accordance with said primary and secondary wheel speed difference, and said second controlling means determines said second addend by multiplying said derivative of said steering input by a sum of a predetermined derivative gain and said increment.

6. A control system according to claim 5 wherein said sensor group comprises a steering wheel angle sensor for sensing a steering wheel angle as said steering input.

7. A control system according to claim 1 wherein said primary driving wheel pair is a rear wheel pair of said vehicle, and said secondary driving wheel pair is a front wheel pair.

8. A control system according to claim 7 wherein said drive force distribution control actuator comprises a front drive clutch which is disposed in a drive path for driving said front wheel pair so that a drive force transmitted to said front wheel pair is decreased as a clutch engagement force of said front drive clutch is decreased.

9. A control system according to claim 8 wherein, as said primary and secondary wheel speed difference increases, said adjusting means varies said derivative control steering quantity in such a direction as to steer said controlled wheel pair in a steering direction which is opposite to a steering direction of said steering input when said controlled wheel pair is said rear wheel pair, and which is identical to said steering direction of said steering input when said controlled wheel pair is said front wheel pair.

10. A control system according to claim 8 wherein said auxiliary steering actuator is provided in a rear wheel steering linkage so that said auxiliary steering actuator can control a rear wheel steer angle.

* * * * *

UNITED STATES PATENT AND TRADEMARK OFFICE
CERTIFICATE OF CORRECTION

PATENT NO. : 4,949,265

DATED : August 14, 1990

INVENTOR(S) : Eguchi et al.

It is certified that error appears in the above-identified patent and that said Letters Patent is hereby corrected as shown below:

Title page:

In item [56] Foreign Patent Documents change, "61-02383" to --61-102383--.

Signed and Sealed this

Tenth Day of December, 1991

Attest:

HARRY F. MANBECK, JR.

Attesting Officer

Commissioner of Patents and Trademarks